(No Model.)

W. JONES.
Axle Box.

No. 239,800. Patented April 5, 1881.

WITNESSES:
Chas. M. Higgins.
Jno. E. Gavin

INVENTOR.
Willis Jones
by S. W. Walaseford
atty

UNITED STATES PATENT OFFICE.

WILLIS JONES, OF BROOKLYN, NEW YORK, ASSIGNOR TO CHARLES JONES, OF NEW HAVEN, CONNECTICUT.

AXLE-BOX.

SPECIFICATION forming part of Letters Patent No. 239,800, dated April 5, 1881.

Application filed December 3, 1880. (No model.)

*To all whom it may concern:*

Be it known that I, WILLIS JONES, of the city of Brooklyn, county of Kings, and State of New York, have invented certain Improvements in Axle-Boxes; and I do hereby declare that the following is a full, clear, and exact description of the same, reference being had to the accompanying drawings, forming part of this specification.

My invention has for its objects the more perfect lubrication of the journals and boxes of the axles of vehicles, securing as collateral advantages the exclusion of dirt, sand, or other abrading material from the bearing-surfaces of such axles and boxes and an improved mode of fixing boxes in hubs.

Figure 1:
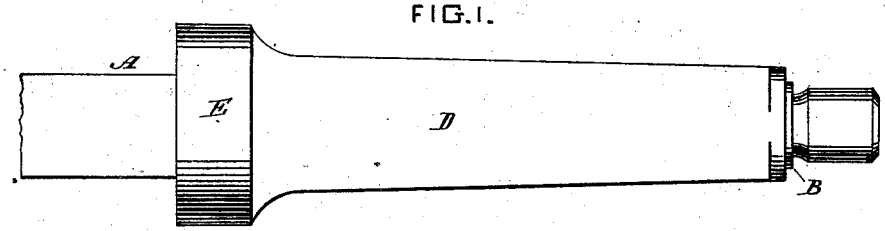
Figure 2:
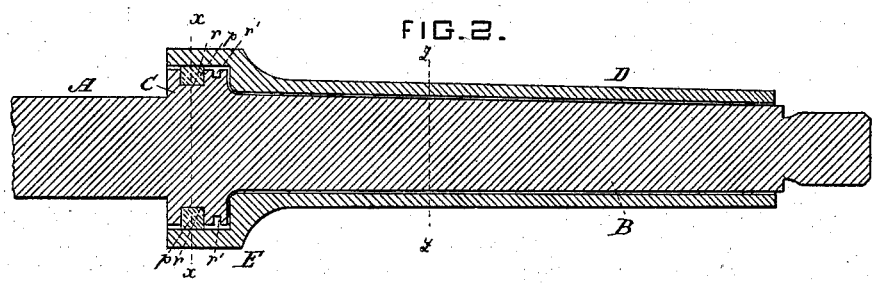
Figure 3:
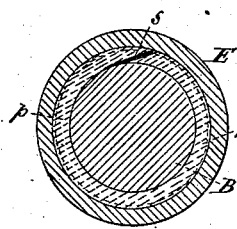
Figure 4:
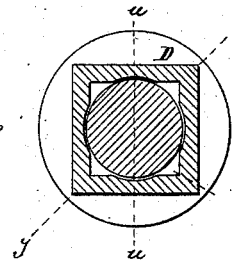
Figure 5:
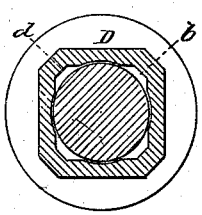
Figure 6:
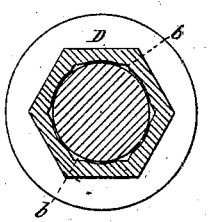

Figure 1 in the drawings is an exterior view of a portion of an axle and box constructed in accordance with my improvements. Fig. 2 is a central longitudinal section of the same, the section being made on the line $u\,u$ in Fig. 4. Fig. 3 is a cross-section made on the line $x\,x$ in Fig. 2. Fig. 4 is a cross-section made on the line $z\,z$ in Fig. 2. Figs. 5 and 6 represent cross-sections of modified forms of my improved axle-box, and Fig. 7 is a longitudinal central section of the box made on the line $y\,y$ in Fig. 4.

A is the axle-tree, B its journal, and C its collar.

D is the box, formed with the usual bell, E. The latter is accurately but easily fitted to the collar C, and the interior bearing-surfaces of said box are also accurately yet easily fitted to the journal B. The bell E of the box has its exterior cylindrical. The part of the box D which is fitted to the journal is preferably made square on the exterior, or square with truncated corners $d$, as shown in Fig. 5, to hold it from turning in the hub, and also to reduce its weight to a minimum; but its exterior may be hexagonal, as shown in Fig. 6, if desired. The interior of the box is also preferably made square in its cross-section, as shown in Fig. 4, with the exception of two bearing-surfaces, $a\,a'$, one at each end of the box, as shown in Fig. 7, the part intervening between said bearing-surfaces being cast on a square core. It may be desirable, however, to truncate the exterior and interior angles of the box, as shown in Fig. 5; but this in no wise affects the general principle of construction, which is to have the part of the interior of the box between the bearing-surfaces $a\,a'$ made up of planes in angular relation; and if, in reaming the box to finish said bearing-surfaces, a slight cut is taken from the middle of each of said planes, as may often be the case, either incidentally or intentionally, as shown at $a''$, Fig. 7, the effect of the general construction upon lubrication is not changed.

Figure 7:
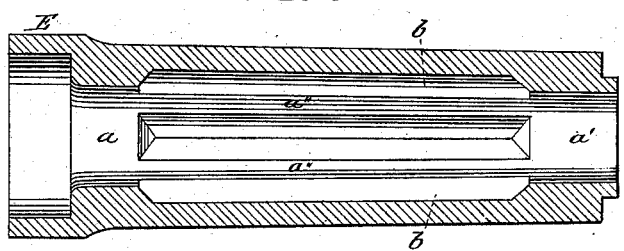

This construction, as will be seen, affords ample space for holding the lubricating material, as indicated at $b$, Figs. 4, 5, and 7. At the same time it enables the box to be very cheaply and strongly made, and the exterior angularity holds it firmly from turning in the hub without any other appliance. An equivalent form would be that shown in Fig. 6, where the cross-section is hexagonal; but this does not afford so much space for the retention of the lubricating material. However, any of the forms described will hold more grease than any other box known to me, and by their use the intervals for renewing the lubricant are less frequent. The box also runs with less friction than any other box known to me.

I also form in the collar C a peripheral oil-groove, $r''$, which will, when covered by the bell E, retain oil for a long time, delivering it as needed to the bearing-surfaces of said collar.

I also form a second peripheral recess or groove, $r$, and fit therein a washer, $p$, of leather or any other suitable material, which is divided at some point, $s$, Fig. 3, and which expands out against the interior of the bell E for the exclusion of sand, dust, dirt, &c., from the bearing-surfaces of said journal and box, and also to prevent escape of oil. But instead of a washer I may use a packing of hemp, cotton wick, or any other material wound into or otherwise inserted into said groove.

I claim—

1. An axle-box having its interior part that incloses the journal made up of the bearing-surfaces $a\,a'$ and planes placed in angular relation and intervening between said bearing-surfaces, substantially as and for the purposes specified.

2. An axle-box having that part of its interior which incloses the journal made up of cylindrical bearing-surfaces $a$ $a'$, and an intervening part between said bearing-surfaces, the cross-section of which intervening part is square, substantially as and for the purposes described.

3. An axle-box a cross-section of which in all parts except the bell and the interior bearing-surfaces, $a$ $a'$, is, in general form, square, both outside and inside, substantially as and for the purposes set forth.

WILLIS JONES.

Witnesses:
L. ALLEN,
JNO. E. GAVIN.